United States Patent
Pfitzer et al.

(10) Patent No.: US 11,050,250 B2
(45) Date of Patent: Jun. 29, 2021

(54) STATIC TRANSFER SWITCH SYSTEM WITH REAL TIME FLUX CONTROL

(71) Applicant: ABB Schweiz AG, Baden (CH)

(72) Inventors: Hans-Erik Pfitzer, Chesterfield, VA (US); Adil Mohammed Oudrhiri, Richmond, VA (US)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 14/940,188

(22) Filed: Nov. 13, 2015

(65) Prior Publication Data

US 2017/0126006 A1    May 4, 2017

Related U.S. Application Data

(60) Provisional application No. 62/248,483, filed on Oct. 30, 2015.

(51) Int. Cl.
   *H02J 3/00*    (2006.01)
(52) U.S. Cl.
   CPC .............. *H02J 3/005* (2013.01); *H02J 3/007* (2020.01); *H02J 3/0073* (2020.01); *H02J 3/0075* (2020.01); *Y04S 10/52* (2013.01)
(58) Field of Classification Search
   CPC .......... H02J 3/005; H02J 3/0073; H02J 3/007; H02J 3/0075; Y04S 10/52
   See application file for complete search history.

(56) References Cited

U.S. PATENT DOCUMENTS

| | | | |
|---|---|---|---|
| 6,327,162 B1 | 12/2001 | Larsen et al. | |
| 6,542,023 B1 | 4/2003 | Daun-Lindberg et al. | |
| 7,157,811 B2 | 1/2007 | Eaton et al. | |
| 7,932,635 B2 | 4/2011 | Shenoy et al. | |
| 9,520,874 B2 * | 12/2016 | Bush | H02J 9/06 |
| 2005/0184592 A1 | 8/2005 | Marwali et al. | |
| 2010/0264743 A1 | 10/2010 | Jung et al. | |

(Continued)

FOREIGN PATENT DOCUMENTS

| | | |
|---|---|---|
| CN | 1084327 A | 3/1994 |
| CN | 1918769 B | 9/2011 |

(Continued)

OTHER PUBLICATIONS

International Search Report & Written Opinion in PCT/US2016/056712 dated Jan. 4, 2017.

*Primary Examiner* — Jung Kim
(74) *Attorney, Agent, or Firm* — Barnes & Thornburg LLP

(57) ABSTRACT

A static transfer switch assembly includes a first digital signal processor circuit associated with a preferred power source to detect a power quality event at the preferred power source, and a second digital signal processor circuit associated with an alternate power source to detect a power quality event at the alternate power source. A third digital signal processor circuit is in communication with each of the first and second digital signal processors and with a transfer switch. The third digital signal processor circuit computes and balances flux in real time based on sample voltages received from each of the preferred and alternate power sources, and controls the transfer switch to transfer the load from one of the power sources to the other power source, based on one of the first or second digital signal processor circuits detecting a power quality event.

20 Claims, 3 Drawing Sheets

(56) References Cited

U.S. PATENT DOCUMENTS

2014/0132074 A1    5/2014   Bush et al.
2014/0139022 A1    5/2014   Bush et al.

FOREIGN PATENT DOCUMENTS

| | | |
|---|---|---|
| CN | 103812209 A | 5/2014 |
| CN | 103840676 A | 6/2014 |
| EP | 2736147 A1 | 5/2014 |
| JP | 2000014046 A | 1/2000 |
| WO | 9401915 A1 | 1/1994 |

\* cited by examiner

STATIC TRANSFER SWITCH SYSTEM WITH REAL TIME FLUX CONTROL

This application claims the benefit of and priority to U.S. Provisional Application No. 62/248,483 filed on Oct. 30, 2015, the content of which is hereby incorporated herein by reference in its entirety.

FIELD

The embodiment relates to transfer switches for toggling between two power sources and, more particularly, to an improved transfer switch system that utilizes real time flux control.

BACKGROUND

A static transfer switch is a device that is meant to toggle from a preferred voltage source to an alternate voltage source when the power quality of the preferred voltage source is deemed unacceptable for the load. The output of the static transfer switch connects to a preferred side of a delta-to-wye transformer as the load. Conventional static transfer switches have many shortcomings such as:
1. High preferred inrush current can be produced and is capable of damaging and degrading electrical equipment. It may also cause unwanted behavior for an uninterruptable power supply upstream that feeds the static transfer switch,
2. Longer than expected transfer time beyond the tolerance of the critical load,
3. Performance is bound to a specific transformer and can degrade if other types are used.

Thus, there is a need to provide a static transfer switch system that overcomes the issues mentioned above.

SUMMARY

An object of the invention is to fulfill the need referred to above. In accordance with the principles of the embodiment, this objective is achieved by providing a static transfer switch assembly including a transfer switch constructed and arranged to be connected with a preferred power source and an alternate power source, and a load so that the transfer switch can selectively connect either of the preferred or alternate power sources to the load. A first digital signal processor circuit is associated with the preferred power source to detect a power quality event at the preferred power source. A second digital signal processor circuit is associated with the alternate power source to detect a power quality event at the alternate power source. A third digital signal processor circuit is in communication with each of the first and second digital signal processors and in communication with the transfer switch. The third digital signal processor circuit is constructed and arranged 1) to compute and balance flux in real time based on digitized sample voltages received from each of the preferred and alternate power sources, and 2) to control the transfer switch to transfer the load from one of the power sources to the other power source, based on one of the first or second digital signal processor circuits detecting a power quality event on the one power source.

In accordance with another aspect of an embodiment, a method is provided for transferring a load between two power sources. The method provides a transfer switch assembly including a transfer switch connected with a preferred power source and an alternate power source, and the load so that the transfer switch can selectively connect either of the preferred or alternate power sources to the load, a first digital signal processor circuit associated with the preferred power source to detect a power quality event at the preferred power source, a second digital signal processor circuit associated with the alternate power source to detect a power quality event at the alternate power source, and a third digital signal processor circuit in communication with each of the first and second digital signal processors and in communication with the transfer switch. A voltage of the preferred power source is sampled with the first digital signal processor circuit and a voltage of the alternate power source is sampled with the second digital signal processor circuit. The third digital signal processor circuit receives the sampled voltages from each of the first and second digital signal processor circuits in real time. The method determines if a power event was detected by first or second digital signal processor circuits based on the received sample voltages. The third digital signal processor circuit computes and balances flux in real time, and controls the transfer switch to transfer the load from one of the power sources to the other power source, based on one of the first or second digital signal processor circuits detecting a power quality event on the one power source.

Other objectives, features and characteristics of the embodiments, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings wherein like numbers indicate like parts, in which.

DETAILED DESCRIPTION OF THE EXEMPLARY EMBODIMENTS

Figure 1:
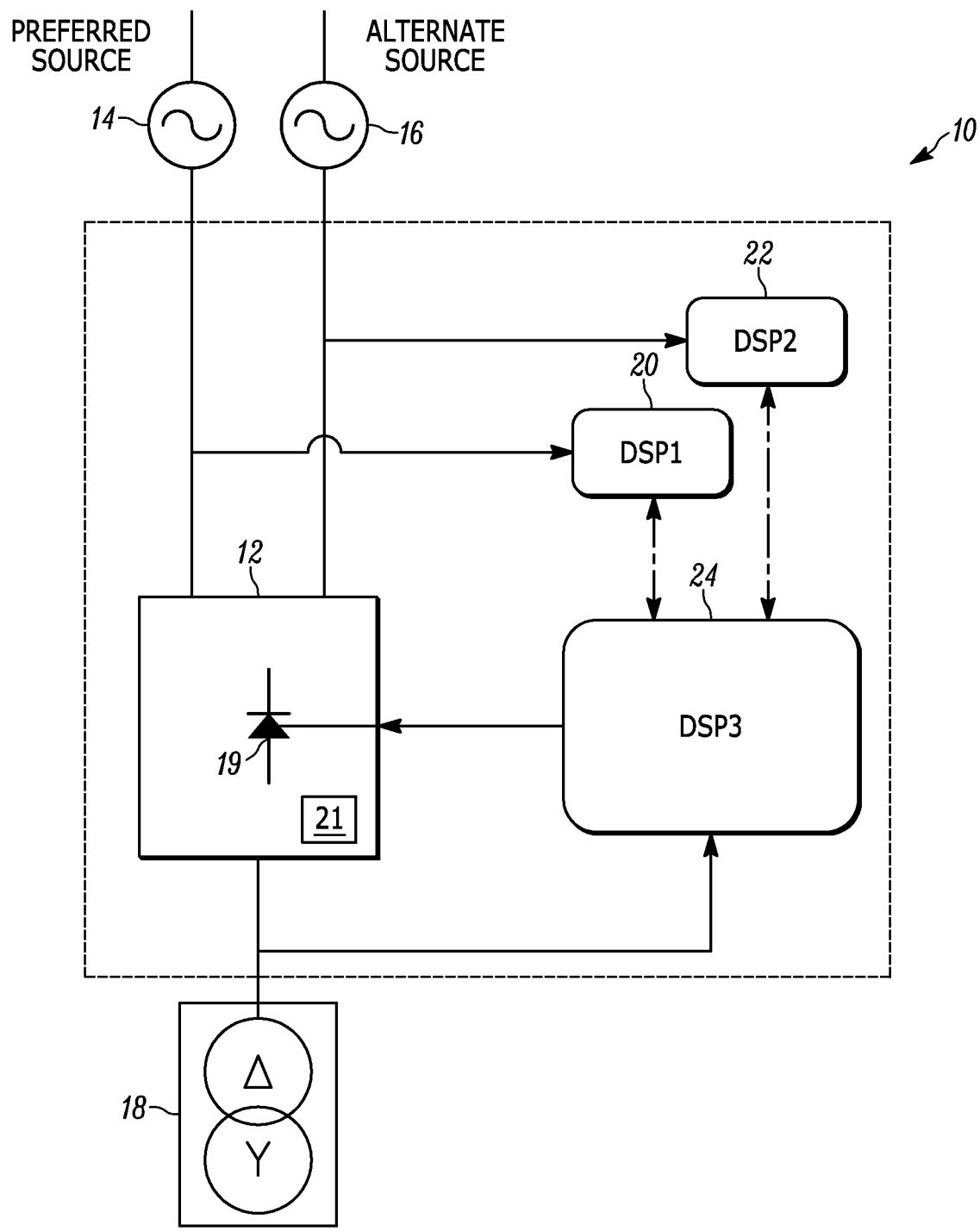
FIG. 1 is a schematic view of a static transfer switch system provided in accordance with an embodiment of the present invention.
Figure 2:
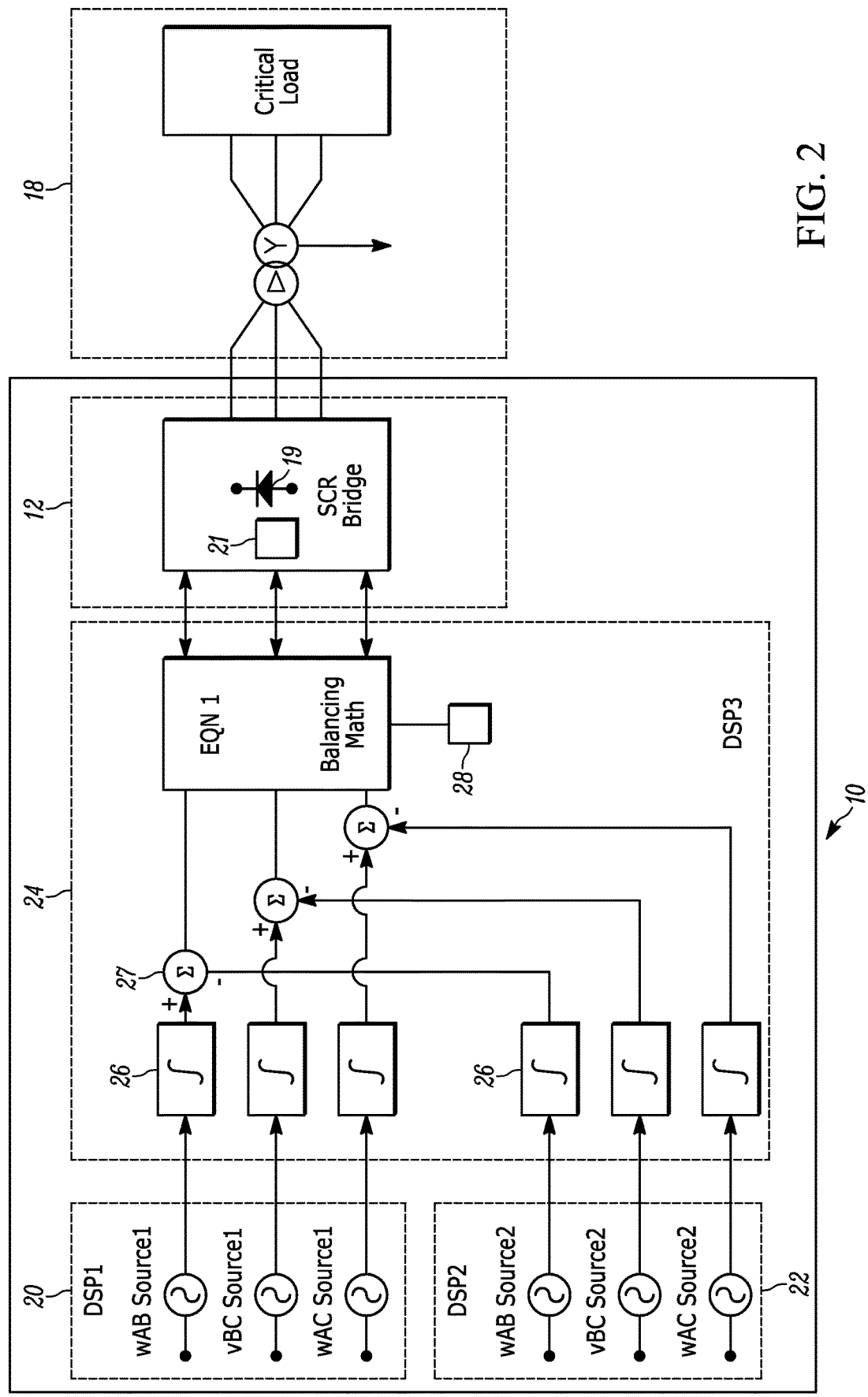
FIG. 2 is a detailed view of the static transfer switch system of FIG. 1.

With reference to FIGS. 1 and 2, schematic view of a static transfer switch system, generally indicated at 10, is shown provided in accordance with an embodiment. The system 10 includes a conventional transfer switch 12 constructed and arranged to selectively connect either a preferred power source 14 (Source1) or an alternate power source 16 (Source 2) to a load 18, such as a delta-to-wye transformer. The power sources 14, 16 are AC power sources. The transfer switch 12 includes the conventional silicon controlled rectifier (SCR) associated with each phase, with one SCR 19 and an associated conventional gate drive 21 shown in FIG. 1 as an example. The transfer switch 12 can be of the type as disclosed, for example, in U.S. Pat. No. 7,932,635, the content of which is hereby incorporated by reference into this specification.

The system 10 also includes a first digital signal processor circuit (DSP1) 20 associated with the preferred power source 14 to detect a power quality event at the preferred power source 14. A second digital signal processor circuit (DSP2) 22 is associated with the alternate power source 16 to detect a power quality event at the alternate power source 16. A third digital signal processor circuit (DSP3) 24 is in communication with each of the first and second digital signal processor circuits 20, 22, respectively, and is also in communication with the transfer switch 12.

The third digital signal processor circuit 24 integrates the voltages at 26 to compute a per unit flux in real time:

$$\lambda = \int v \cdot dt$$

where $\lambda$ is the normalized flux and $v$ is the voltage at the power source.

The third digital signal processor circuit 24 computes the fluxes after receiving digitized sample voltages from both the preferred and alternate power sources 14 and 16 as monitored by the first and second digital signal processor circuits 20 and 22, respectively. The third digital signal processor circuit 24 then determines the optimal time for operating the transfer switch 12 to transfer the critical load 18 to the alternate power source 16 if the first digital signal processor circuit 20 detect a power quality event (e.g., power outside a set range) at the preferred power source 14. The algorithm of the embodiment also allows for an error margin so a tradeoff can be realized between the transformer inrush and transfer time:

$$\begin{cases} \lambda 1 = \int v1(t) \cdot dt \\ \lambda 2 = \int v2(t) \cdot dt \end{cases} \Leftrightarrow |\lambda 1 - \lambda 2| \le \epsilon \qquad \text{Equation 1}$$

where:
$\lambda 1$ is the normalized three phase fluxes of the preferred power source 14.
$\lambda 2$ is the normalized three phase fluxes of the alternate power source 16.
$\epsilon$ is an arbitrary error value allowing the tradeoff between peak inrush current and transfer time.

The power sources 14 and 16 are preferably three-phase power sources (phases A, B, C). Thus, in particularly with reference to FIG. 3, the third digital signal processor circuit 24 continuously computes the three phase fluxes of the preferred power source 14 (Source 1) and the three phase fluxes of the alternate power source 16 (Source2). The third digital signal processor circuit 24 continuously computes the normalized fluxes as shown below:

$$\begin{cases} \lambda A\_primary = \int vA\_primary(t) \cdot dt \\ \lambda B\_primary = \int vB\_primary(t) \cdot dt \\ \lambda C\_primary = \int vA\_primary(t) \cdot dt \end{cases}$$

$$\begin{cases} \lambda A\_secondary = \int vA\_secondary(t) \cdot dt \\ \lambda B\_secondary = \int vB\_secondary(t) \cdot dt \\ \lambda C\_secondary = \int vC\_secondary(t) \cdot dt \end{cases}$$

If the power quality of the preferred power source 14 is not within a range that the customer defines in the power quality limits settings due to an external power quality event, an emergency transfer is needed. In that case, the transfer switch 12 needs to transfer to the alternate power source 16 and the third digital signal processor circuit 24, using summing circuits 27, starts computing Equation 1 as:

$$\begin{cases} |\lambda A\_secondary - \lambda A\_primary| \le \epsilon \\ |\lambda B\_secondary - \lambda B\_primary| \le \epsilon \\ |\lambda C\_secondary - \lambda C\_primary| \le \epsilon \end{cases} \qquad \text{Equation 1}$$

The algorithm executed by the third digital signal processor circuit 24 determines the very first phase that satisfies Equation 1 and then automatically commands the associated gate drive 21 to fire that phase. This is repeated once again to complete firing all the SCRs 19. Should there be an instance where all phases are satisfying the Equation 1 above, all of phases will be fired substantially simultaneously.

The error $\epsilon$ is kept as small as possible to completely eliminate inrush current. However, if one wants to tolerate some inrush and speed up the transfer, the algorithm executed by third digital signal processor circuit 24 will increase the value of the error as set by the software.

Thus, the third digital signal processor circuit 24 (DSP3) is constructed and arranged to compute and balance fluxes of the preferred power source 14 and alternate power source 16 in real time based on digitized sample voltages received from each of the preferred and alternate power sources. The third digital signal processor circuit 24 (DSP3) also is constructed and arranged to determine an optimal time to control the transfer switch 12 to cause the transfer switch 12 to switch power to the load 18 from the preferred power source 14 to the alternate power source 16, based on the first digital signal processor circuit 20 detecting a power quality event on the preferred power source 14. In this way, power to the load 18 is not interrupted and inrush current and transfer time are each minimized.

Figure 3:
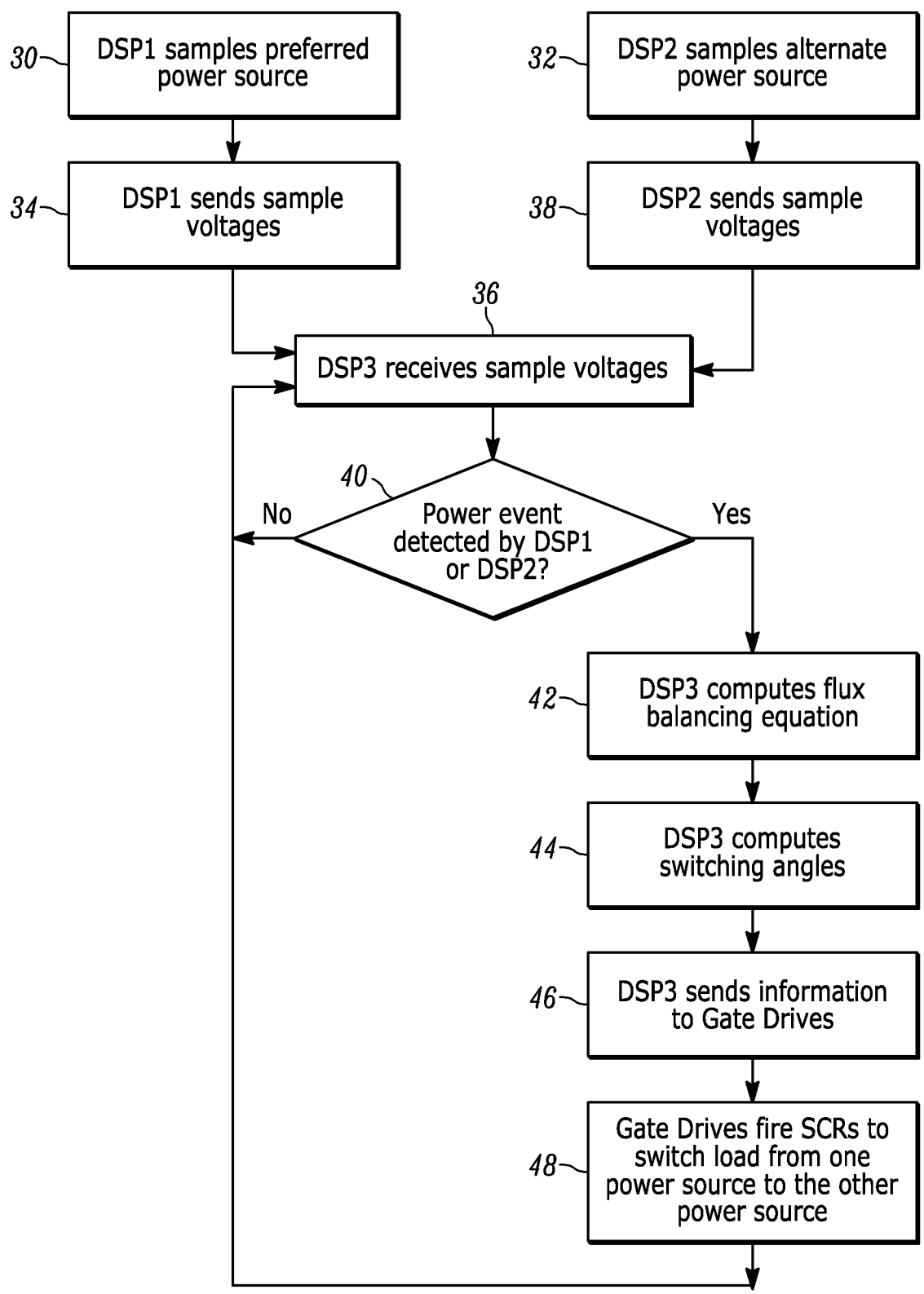
FIG. 3 is a flowchart of a method performed by the static transfer switch system of FIG. 2.

More specifically, with reference to FIG. 3, the steps or algorithm for performing a method of transferring a load 18 between the two power sources 14, 16 are shown where in step 30, DSP1 samples the voltage of the preferred power source 14 while in step 32, DSP2 samples the voltage of the alternate power source 16. In step 34, DSP1 sends the sample voltages which are received by DSP3 in step 36. In addition, in step 38, DSP2 sends the sample voltages which are received by DSP3 in step 36. In the embodiment, the voltage samples are sent or received about every 130 μs (e.g., in real time). In step 40, DSP3 determines if a power event (such as power outside a set range) was detected by DSP1 or DSP2 based on the received sample voltages. If not, the sampled voltages are continued to be monitored. If a power event was detected for example by DSP1, in step 42, DSP3 computes the flux balancing equation (Equation 1 above).

DSP3 then computes the switching angles in step 44. This done in the gate drives 21. The communication link between the DSP3 and the gate drives 21 is so fast that the gate drives 21 are able to fire all phases at the same time if it is controlled to do so. This produces the appropriate waveform with the switching angle command by the DSP3.

It can be appreciated that instead of using integral calculations for flux determination, the flux can be determined in other manners such as using the Trapezoidal rule. Since the fluxes are normalized, the assembly 10 is tolerant to any type of transfers and is not bound to a specific KVA rating, making the method suitable for many load types.

The embodiment enables the customer to have flexibility to allow for a pre-determined amount of inrush current to speed up transfer time, making the method very customizable. The embodiment allows for firing any SCRs or all of them as deemed acceptable by the algorithm allowing the user to do super transfers if the fluxes of the alternate source are deemed satisfactory to equation 1. This is possible only under certain cases if the phase difference between the two sources allows for such a condition to happen. If a super transfer done, then the transfer is accomplish very quickly, with the transfer plus sense time occurring in less than 8 milliseconds.

It can be appreciated that instead of using integral calculations for flux determination, the flux can be determined in other manners such as using the Trapezoidal rule. Since the fluxes are normalized, the assembly 10 is tolerant to any type of transfers and is not bound to a specific KVA rating, making the method suitable for many load types.

The digital signal processor circuits disclosed herein can be of the type TMS320C6746, manufactured by Texas Instruments.

The operations and algorithms described herein can be implemented as executable code within the third digital signal processor circuit 24, or stored on a standalone computer or machine readable non-transitory tangible storage medium that are completed based on execution of the code by a processor circuit implemented using one or more integrated circuits. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). Any of these circuits also can be implemented using a software-based executable resource that is executed by a corresponding internal processor circuit such as a microprocessor circuit (not shown) and implemented using one or more integrated circuits, where execution of executable code stored in an internal memory circuit (e.g., within the memory circuit 28) causes the integrated circuit(s) implementing the third digital signal processor circuit 24 to store application state variables in processor memory, creating an executable application resource (e.g., an application instance) that performs the operations of the circuit as described herein. Hence, use of the term "circuit" in this specification refers to both a hardware-based circuit implemented using one or more integrated circuits and that includes logic for performing the described operations, or a software-based circuit that includes a processor circuit (implemented using one or more integrated circuits), the processor circuit including a reserved portion of processor memory for storage of application state data and application variables that are modified by execution of the executable code by a processor circuit. The memory circuit 28 can be implemented, for example, using a non-volatile memory such as a programmable read only memory (PROM) or an EPROM, and/or a volatile memory such as a DRAM, etc.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A static transfer switch assembly comprising:
a transfer switch constructed and arranged to be connected with a preferred power source and an alternate power source, and a load so that the transfer switch can selectively connect either of the preferred or alternate power sources to the load,
a first digital signal processor circuit associated with the preferred power source to detect whether power of the preferred power source is outside of a first set range,
a second digital signal processor circuit associated with the alternate power source to detect whether power of the alternate power source is outside of a second set range, and
a third digital signal processor circuit in communication with each of the first and second digital signal processor circuits and in communication with the transfer switch,
wherein the third digital signal processor circuit is constructed and arranged 1) to compute and balance flux in real time based on digitized sample voltages of each of the preferred and alternate power sources, the digitized sample voltages received by the third digital signal processor circuit from the first and second digital signal processor circuits respectively associated with the preferred and alternate power sources, 2) to compute switching angles that are transmitted to the transfer switch as a switching angle command for transferring the load between the preferred and alternate power sources, 3) when the preferred power source is powering the load, to control the transfer switch using the switching angle command to transfer the load from the preferred power source to the alternate power source, based on the first digital signal processor circuit detecting that the power of the preferred power source is outside of the first set range, 4) when the alternate power source is powering the load, to control the transfer switch using the switching angle command to transfer the load from the alternate power source to the preferred power source, based on the second digital signal processor circuit detecting that the power of the alternate power source is outside of the second set range, and 5) to operate the transfer switch by allowing a predetermined amount of inrush current in order to decrease a transfer time of the transfer switch as compared to a transfer time when eliminating inrush current.

2. The assembly of claim 1, wherein the preferred and alternate power sources are each three-phase power sources and wherein the third digital signal processor circuit includes voltage integrator circuits and summing circuits and is constructed and arranged to compute a per unit flux in real time and to execute the following expression:

$$\begin{cases} \lambda 1 = \int v1(t) \cdot dt \\ \lambda 2 = \int v2(t) \cdot dt \end{cases} \Leftrightarrow |\lambda 1 - \lambda 2| \leq \epsilon$$

where:
$\lambda 1$ is normalized three phase fluxes of the preferred power source, and v1 is the voltage at the preferred power source, $\lambda 2$ is normalized three phase fluxes of the alternate power source, and v2 is the voltage at the alternate power source, and $\epsilon$ is an error value relating to peak inrush.

3. The assembly of claim 2, wherein the transfer switch includes a silicon controlled rectifier (SCR) associated with each phase, and a gate drive associated with each SCR.

4. The assembly of claim 3, wherein the third digital signal processor circuit is constructed and arranged to determine a phase that satisfies said expression and to control the associated gate drive to fire the phase.

5. The assembly of claim 3, wherein the third digital signal processor circuit is constructed and arranged to control all of the gate drives to fire all phase simultaneously.

6. The assembly of claim 1, wherein the load includes a transformer.

7. The assembly of claim 6, wherein the transformer is a delta-to-wye transformer.

8. The assembly of claim 1, wherein the third digital signal processor circuit is constructed and arranged to automatically control the transfer switch to transfer the load from said one power source to the other power source.

9. A method of transferring a load between two power sources using a transfer switch assembly comprising a transfer switch connected with a preferred power source, an alternate power source, and the load so that the transfer switch can selectively connect either of the preferred or alternate power sources to the load, a first digital signal processor circuit associated with the preferred power source to detect whether power of the preferred power source is outside of a first set range, a second digital signal processor circuit associated with the alternate power source to detect whether power of the alternate power source is outside of a second set range, and a third digital signal processor circuit in communication with each of the first and second digital signal processor circuits and in communication with the transfer switch, the method comprising the steps of:

sampling a voltage of the preferred power source with the first digital signal processor circuit, sampling a voltage of the alternate power source with the second digital signal processor circuit, receiving, by the third digital signal processor circuit, the sampled voltages from each of the first and second digital signal processor circuits in real time, determining if the power of the preferred power source is outside of the first set range by the third digital signal processor circuit based on the sample voltages received from the first digital signal processor circuit, determining if the power of the alternate power source is outside of the second set range by the third digital signal processor circuit based on the sample voltages received from the second digital signal processor circuit, computing and balancing flux in real time in the third digital signal processor circuit, when the preferred power source is powering the load, controlling the transfer switch by the third digital signal processor circuit to transfer the load from the preferred power source to the alternate power source, based on the first digital signal processor circuit detecting that the power of the preferred power source is outside of the first set range, when the alternate power source is powering the load, controlling the transfer switch by the third digital signal processor circuit to transfer the load from the alternate power source to the preferred power source, based on the second digital signal processor circuit detecting that the power of the alternate power source is outside of the second set range, and operating the transfer switch according to commands from the third digital signal processor circuit such that a predetermined amount of inrush current is allowed in order to decrease a transfer time of the transfer switch as compared to a transfer time when eliminating inrush current.

10. The method of claim 9, wherein the preferred and alternate power sources are each three-phase power sources and wherein the third digital signal processor circuit includes voltage integrator circuits and summing circuits, and wherein the computing and balancing step computes a per unit flux in real time using following expression:

$$\begin{cases} \lambda 1 = \int v1(t) \cdot dt \\ \lambda 2 = \int v2(t) \cdot dt \end{cases} \Leftrightarrow |\lambda 1 \ \lambda 2| \le \epsilon$$

where:

$\lambda 1$ is normalized three phase fluxes of the preferred power source, and v1 is the voltage at the preferred power source, $\lambda 2$ is normalized three phase fluxes of the alternate power source, and v2 is the voltage at the alternate power source, and $\epsilon$ is an error value relating to peak inrush current.

11. The method of claim 10, further comprising defining E to control inrush current.

12. The method of claim 9, wherein the sample voltages are received about every 130 µs.

13. The method of claim 9, wherein the transfer switch includes a silicon controlled rectifier (SCR) associated with each phase, and a gate drive associated with each SCR, and the controlling step controls the gate drives.

14. The method of claim 13, wherein the third digital signal processor circuit determines a phase that satisfies said expression controls the associated gate drive to fire the phase.

15. The method of claim 9, wherein the load includes a delta-to-wye transformer.

16. The method of claim 9, wherein the third digital signal processor circuit automatically controls the transfer switch to transfer the load from said one power source to the other power source.

17. The method of claim 13, wherein the third digital signal processor circuit controls all of the gate drives to fire all phase simultaneously.

18. The assembly of claim 1, wherein the third digital signal processor circuit is constructed and arranged to operate the transfer switch by allowing a predetermined amount of inrush current to decrease a transfer time of the transfer switch.

19. The assembly of claim 1, wherein the third digital signal processor circuit is constructed and arranged to operate the transfer switch without interrupting power to the load.

20. The method of claim 10, wherein the error value relating to the peak inrush current is customizable for determining transfer time.

* * * * *